US008352466B2

(12) United States Patent
Jones et al.

(10) Patent No.: US 8,352,466 B2
(45) Date of Patent: Jan. 8, 2013

(54) SYSTEM AND METHOD OF GEO-BASED PREDICTION IN SEARCH RESULT SELECTION

(75) Inventors: Rosie Jones, Cambridge, MA (US); Fernando Diaz, Montreal (CA); Ahmed Hassan Awadallah, Ann Arbor, MI (US)

(73) Assignee: Yahoo! Inc., Sunnyvale, CA (US)

( * ) Notice: Subject to any disclaimer, the term of this patent is extended or adjusted under 35 U.S.C. 154(b) by 622 days.

(21) Appl. No.: 12/341,327

(22) Filed: Dec. 22, 2008

(65) Prior Publication Data

US 2010/0161591 A1 Jun. 24, 2010

(51) Int. Cl.
*G06F 17/30* (2006.01)
(52) U.S. Cl. ........................ 707/724; 707/729
(58) Field of Classification Search .................. 707/724, 707/729
See application file for complete search history.

(56) References Cited

U.S. PATENT DOCUMENTS

| | | | | |
|---|---|---|---|---|
| 6,377,961 | B1* | 4/2002 | Ryu | 1/1 |
| 7,606,798 | B2* | 10/2009 | Ge et al. | 1/1 |
| 7,917,490 | B2* | 3/2011 | Norris et al. | 707/707 |
| 2005/0108213 | A1 | 5/2005 | Riise et al. | |
| 2006/0085392 | A1* | 4/2006 | Wang et al. | 707/3 |
| 2008/0172362 | A1* | 7/2008 | Shacham et al. | 707/3 |
| 2008/0172374 | A1* | 7/2008 | Wolosin et al. | 707/5 |

OTHER PUBLICATIONS

U.S. Appl. No. 12/104,111, filed Apr. 16, 2008, Parekh et al.
Allan James, "HARD Track Overview in TREC 2004 High Accuracy Retrieval from Documents"; Center for Intelligent Information Retrieval; Department of Computer Science, University of Massachusetts Amherst, TREC 2004; 11 pages.
Backstrom, et al. Kumar et al. "Spatial Variation in Search Engine Queries"; Dep't of Cornell University, Ithaca, NY 14853; Yahoo! Research, Sunnyvale CA 94089; IOnternational World Wide Web Conference Committee 2008; Apr. 21-25, 2008, Beijing, China; 10 pages.
Friedman Jerome H., "Greedy Function Approximation: A Gradient Boosting Machine"; Sequoia Hall, Stanford University, Stanford, CA 94305; IMS 1999 Reitz Lecture; Feb. 24, 1999 (modified Mar. 15, 2000); 36 pages.
Friedman Jerome H., "Stochastic Gradient Boosting" CSIRO, Mathematical and Informational Sciences, Australia CMIS, Locked Bag 17, North Ryde NSW 1670; Mar. 26, 1999.
Gan, et al. and Markowetz. "Analysis of Geographic Queries in a Search Engine Log"; Polytechnic University; Brooklyn NY, University of Science & Technology, Hong Kong, S.A.R.; LocWeb 2008, Apr. 22, 2008; Beijing, China; 8 pages.
Joachims Thorsten., "Making Large-Scale SVM Learning Practical"; MIT Press Cambridge, USA 1998; 16 pages.
Jones, et al. "Geographic Intention and Modification in Web Search"; International Journal of Geographical Information Science; vol. 22, No. 3, Jul. 2008, 20 pages.

(Continued)

*Primary Examiner* — Khanh Pham
(74) *Attorney, Agent, or Firm* — James J. DeCarlo; Greenberg Traurig, LLP

(57) ABSTRACT

A system and method is disclosed for determining a prediction measurement, or measure, using geo-spatial information which can be used to determine whether or not to include type of information in search results. The prediction measurement comprises a measure of the likelihood that an item of the type of information for which the prediction measure is determined will be selected, or clicked on, by a user, if the item of the type of information is included in the search result. Without limitation, one such information type is news.

30 Claims, 10 Drawing Sheets

OTHER PUBLICATIONS

Figure 1:
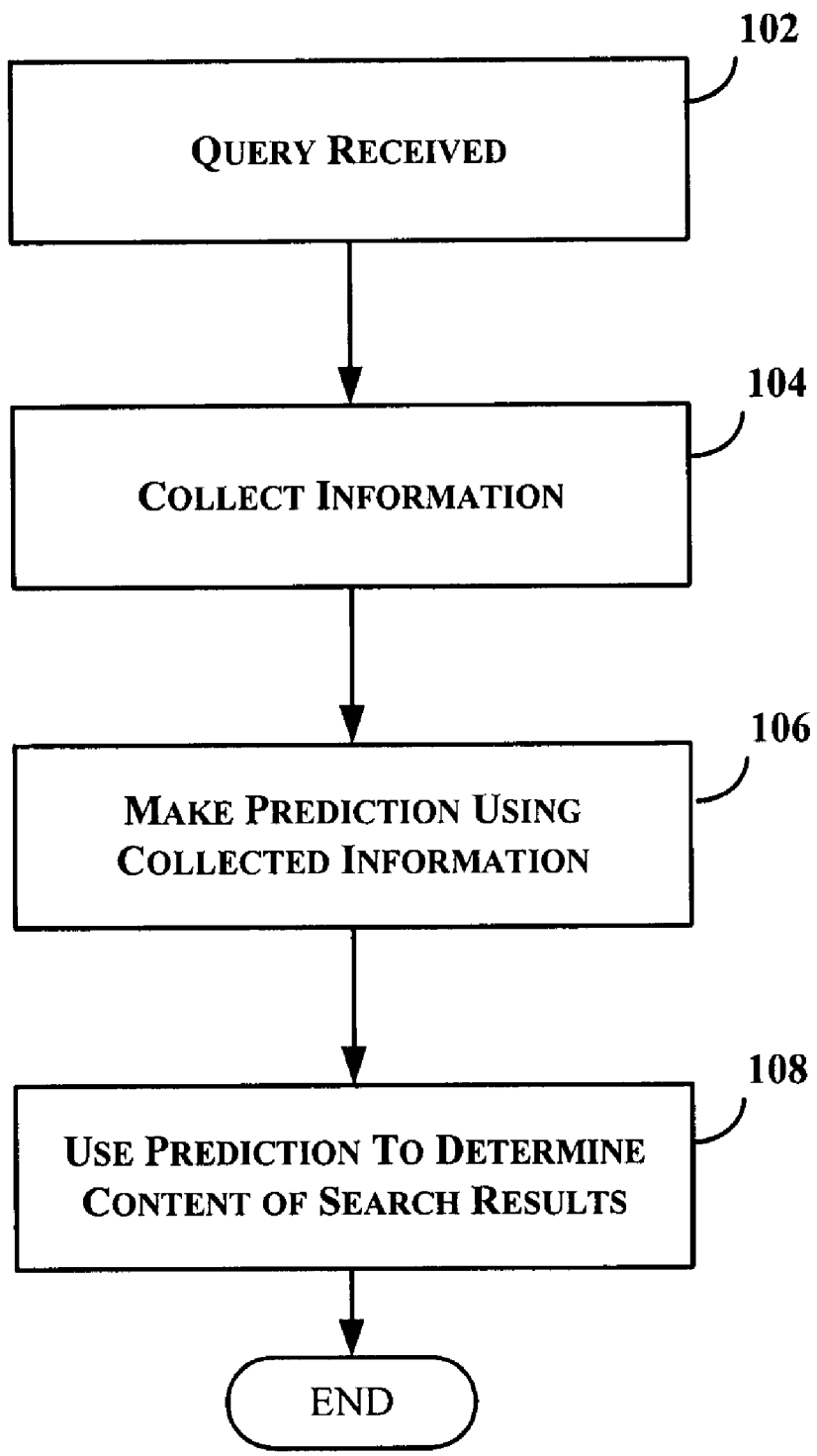

Mehler A, et al. "Spatial Analysis of News Sources" IEEE Transactions on Visualization and Computer Graphics, vol. 12, No. 5, Sep./Oct. 2006; 7 pages.

Mei Q., et al. "A Probabilistic Approach to Spatiotemporal Theme Pattern Mining on Weblogs"; World Wide Web Conference Committee; WWW 2006, May 23-26, 2006, Edingburg, Scotland; 10 pages.

Sanderson M., et al. "Analyzing geographic queries"; Department of Information Studies, University of Sheffield, Sheffield, UK; 2001; 2 pages.

* cited by examiner

| Bin | Range |
|---|---|
| Very Low | 0 - 2000 |
| Low | 2000 - 4000 |
| Intermediate | 4000 - 6000 |
| High | 6000 - 8000 |
| Very High | 8000 - 10000+ |

Population density bins - in person/km$^2$

| Bin | Range |
|---|---|
| Very Close | 0 - 10 |
| Close | 10 - 740 |
| Intermediate | 740 - 2179 |
| Far | 2179 - 6650 |
| Very Far | 6650 – 19472 |

Distance in km

| Importance | Feature | Description | Exemplary Value(s)/Range(s) |
|---|---|---|---|
| 33.1 | loc_conf | Location Confidence | Numeric value between 0 and 1 |
| 100.0 | word_click_score | Location Word/Click Probability Score | Numeric value between 0 and 1 |
| 40.9 | loc_type | Location Type | Numeric value from set, e.g., [1, 2, 3, 4, 5, 6, 7, 8, ...] |
| 18.6 | pop_density | Population density of user's location | Numeric value |
| 24.7 | dist | Distance between user's location and location specified in query | Numeric value |
| 5.9 | same_cntry | User and query location in same country | Binary value, e.g., [0,1] |
| 5.4 | same_state | User and query location in same state | Binary value, e.g., [0,1] |

FIGURE 8A

| query String/Terms | Pakistan | Mexico, News | Obama, Japan | Dora | ancient egypt | san antonio spurs | virtual hollywood | us airways |
|---|---|---|---|---|---|---|---|---|
| loc_conf | 0.940413 | 0.678788 | 0.943099 | 0.525755 | 0.872571 | 0.848523 | 0.726295 | 0.575254 |
| loc_type | 1 | 1 | 4 | 5 | 1 | 16 | 7 | 1 |
| same_cntry | 0 | 0 | 0 | 0 | 0 | 1 | 1 | 1 |
| relvdist | 11363.622 | 4068.886 | 155.162 | 12329.835 | 10548.471 | 208.794 | 3811.970 | 7858.359 |
| dist | 9973.764 | 647.663 | 153.392 | 10289.361 | 8893.202 | 208.230 | 3941.905 | 0.000000 |
| target | 1 | 1 | 1 | 1 | 1 | 1 | 1 | 1 |
| word_click_score: | 0.9027778 | 0.3695652 | 0.5 | 0.36 | 0.625 | 0.7 | 0.5135135 | 0.3559322 |
| locnewsprob2 | 0.9027778 | 0.6648993 | 0.8518519 | 0.36 | 0.625 | 0.6666667 | 0.1134100 | 0.3636364 |
| population | 900000 | 776733 | 900000 | 900000 | 900000 | 277454 | 8008278 | 781870 |
| pop_density | 2000 | 6422.57 | 2000 | 2000 | 2000 | 692.746 | 10194.2 | 835.12 |

FIGURE 8B

| Feature Name | Description |
| --- | --- |
| news_searches_crnt | number of news searches for the current day |
| web_searches_crnt | number of web searches for the current day |
| news_web_crnt | news searches/web searches for the current day |
| news_searches_prv | number of news searches for the previous day |
| web_searches_prv | number of web searches for the previous day |
| news_web_prv | news searches/web searches for the previous day |
| word_news | Whether the query contains the word "news" |

FIGURE 9

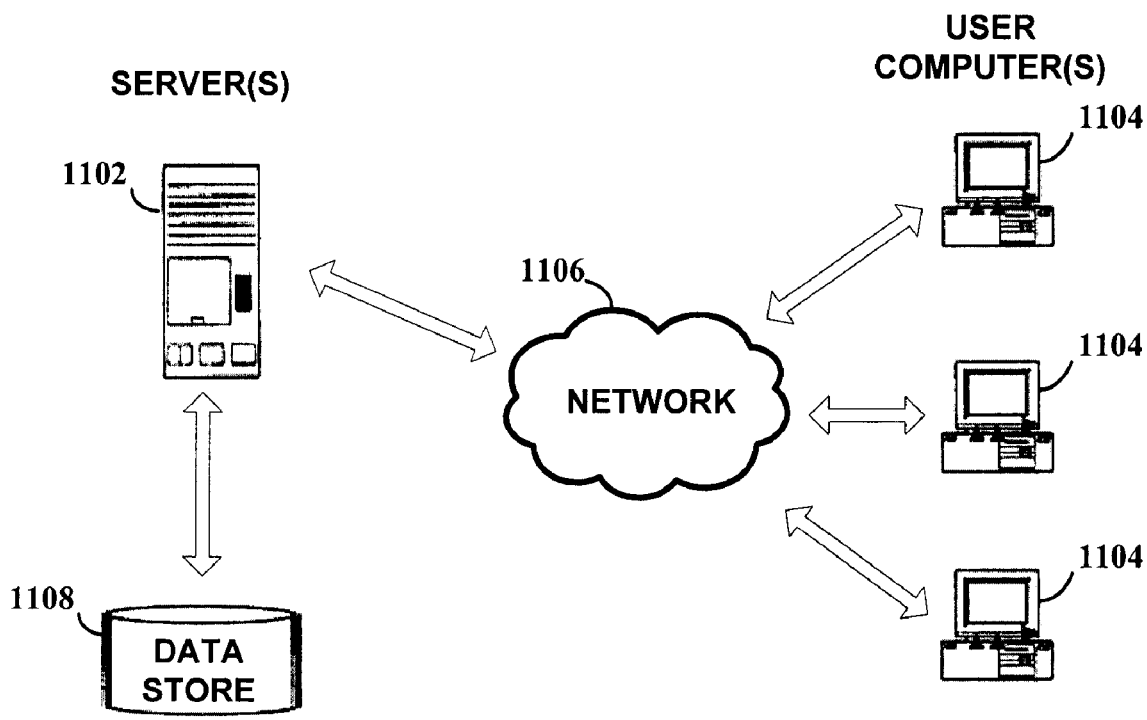

FIGURE 11

SYSTEM AND METHOD OF GEO-BASED PREDICTION IN SEARCH RESULT SELECTION

FIELD OF THE DISCLOSURE

The present disclosure relates to displaying search results, such as those provided by a web search engine, and in particular to determining whether or not to display a type of information, e.g., news items or stories, in response to a search request.

BACKGROUND

The web is a source of a vast amount of information made available by any number of providers. As one example, news providers that make news available in print, television and radio form at various levels, e.g., local, national and international levels, may make such news available via the web, e.g., the provider's web site. It is clear that other forms of information are also available via the web, and that more and more information will become available via the web over time.

Rather than visiting one or more specific web sites, a user typically performs a search of the web using a search engine to find information online via the web. A search engine provides a mechanism that allows a user to search for information using search criteria, e.g., key words or phrases. A search engine typically identifies multiple items of information, selects some number of the identified items using one or more criteria, e.g., relevance, and presents the selected items to the user. In many cases, the selected items are presented to the user in an order based on a ranking associated with each item, where the ranking can be based on the same or different criteria used to select the items.

SUMMARY

A search engine receives queries having diverse characteristics from a number of users having diverse characteristics. A user that searches the web, e.g., a web searcher, may or may not be interested in a particular type of information item, such as news items or stories. It would be beneficial to be able to determine a user's interest in a given type of information, such as news items, based at least in part on characteristics determined for a given query, e.g., user and query characteristics.

The present disclosure seeks to address failings in the art and provides systems and methods for determining, or predicting, whether or not to provide a type of information, such as news items, in response to a search request. Embodiments of the present disclosure provide a prediction measurement, or measure, that can be used to determine whether or not to include an information type in search results. In accordance with one or more such embodiments, the prediction measurement comprises a measure of the likelihood that a user will click on the information type if the type of information is included in the search result. In accordance with one or more embodiments, one such information type is news. It should be apparent, however, that embodiments of the present disclosure may be used with other types of information.

By virtue of such an arrangement and without limitation, it is possible to customize search results for a user thereby improving a user's satisfaction with the search results. Search results generated using the search criteria specified in a query can be customized using the prediction measure generated in accordance with one or more embodiments to include, or exclude, a specific type of information type. In a case that the prediction measure indicates that the information type would not be of interest to the user, the type of information can be excluded from the search results returned to the user. In a case that the prediction measure indicates that the information type would be of interest to the user, the type of information can be included in the search results returned to the user.

Embodiments of the present disclosure use a prediction model that is created based on an analysis of usage logs that correlate one or more factors with a number of clicks, or selection of an information type, and a number of "noclicks," or non-selection of the information type. In accordance with one or more embodiments, the prediction model is created for a specific type of information, e.g., news. However, it should be apparent that the prediction model can be created for other information types and/or a combination of information types.

In accordance with one or more embodiments, a method is provided, which comprises collecting information using a received query, the information comprises geo-spatial information, and calculating a prediction measure using the collected information, the prediction measure being a measure of the likelihood that a user will select a type of information returned in response to the query.

In accordance with one or more embodiments, a system is provided, which comprises a feature extractor configured to collect information using a received query, the information comprises geo-spatial information, and a prediction engine configured to calculate a prediction measure using the collected information, the prediction measure being a measure of the likelihood that a user will select a type of information returned in response to the query.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an example of a click prediction process flow in accordance with one or more embodiments of the present disclosure.

Figure 2:
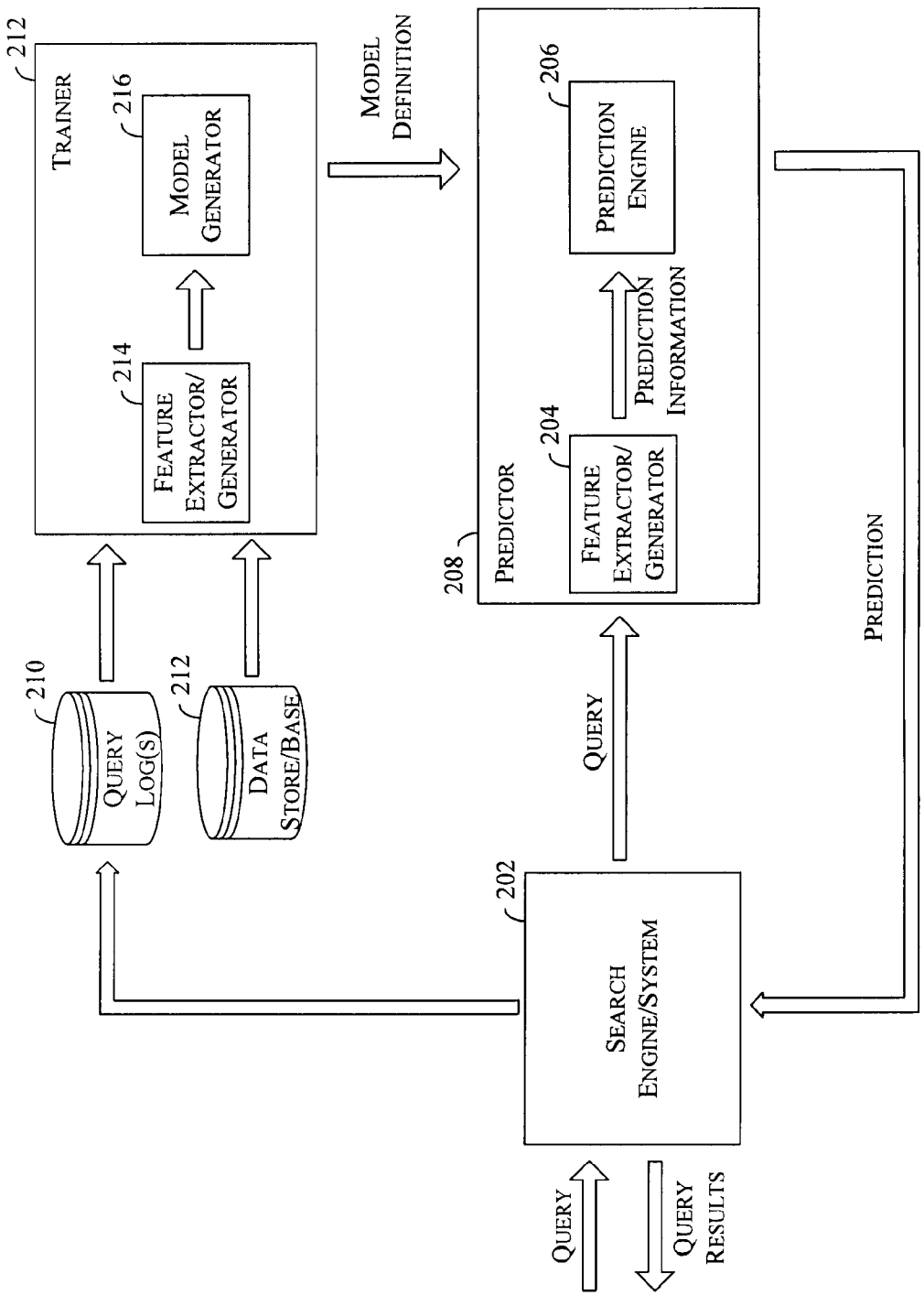

FIG. 2 provides a general overview of system components for use in accordance with one or more embodiments.

Figure 3:
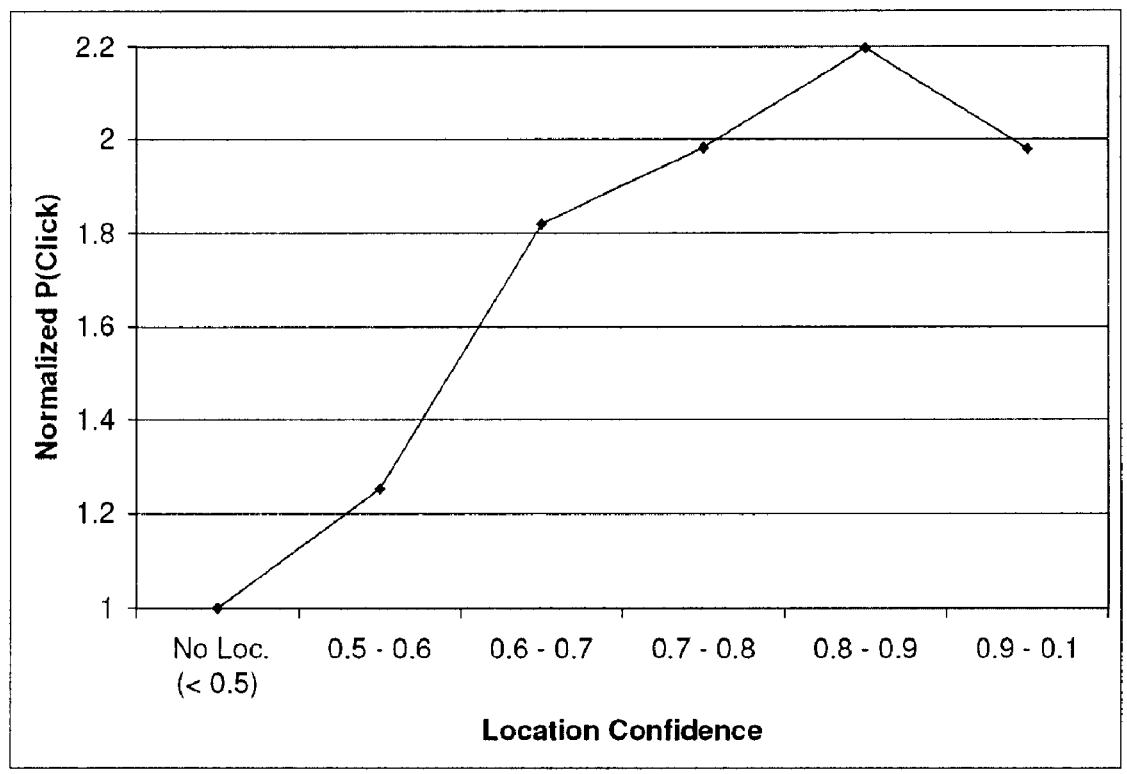

FIG. 3 provides a graphic example of news click probabilities and levels of confidence in the location in a query for use in accordance with one or more embodiments of the present disclosure.

Figure 4:
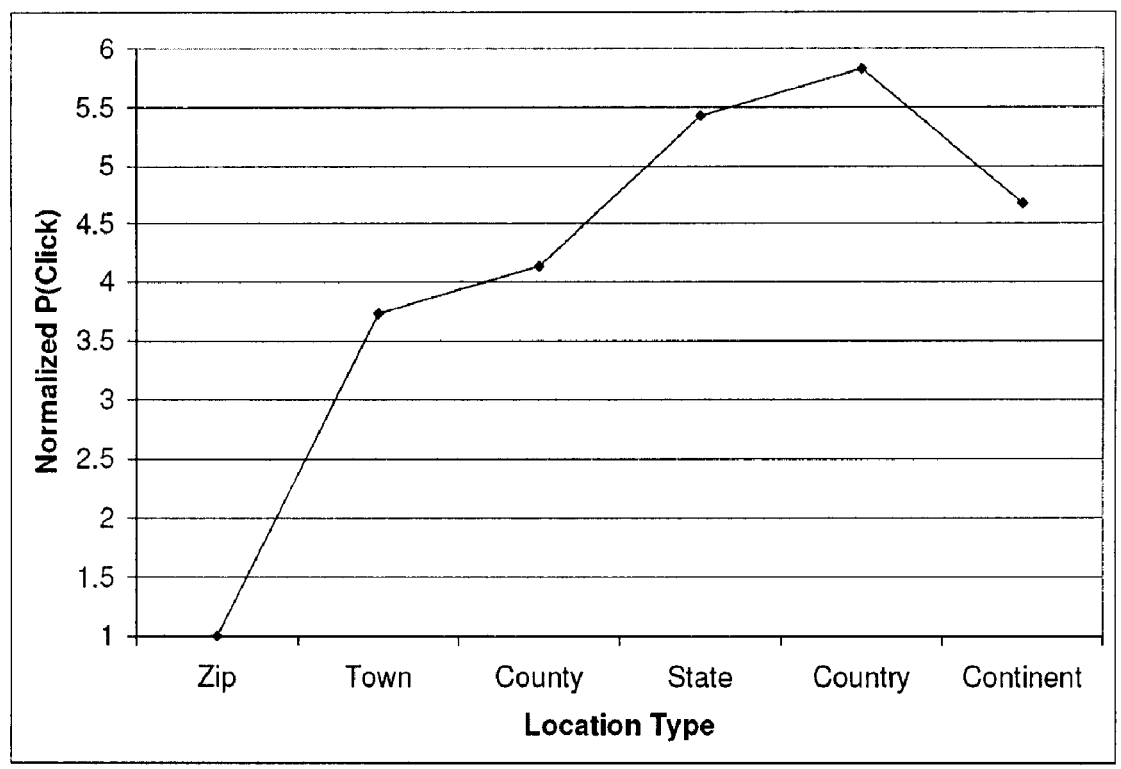

FIG. 4 provides a graphic example of news click probabilities and type of a location identified in a query for use in accordance with one or more embodiments of the present disclosure.

Figure 5:
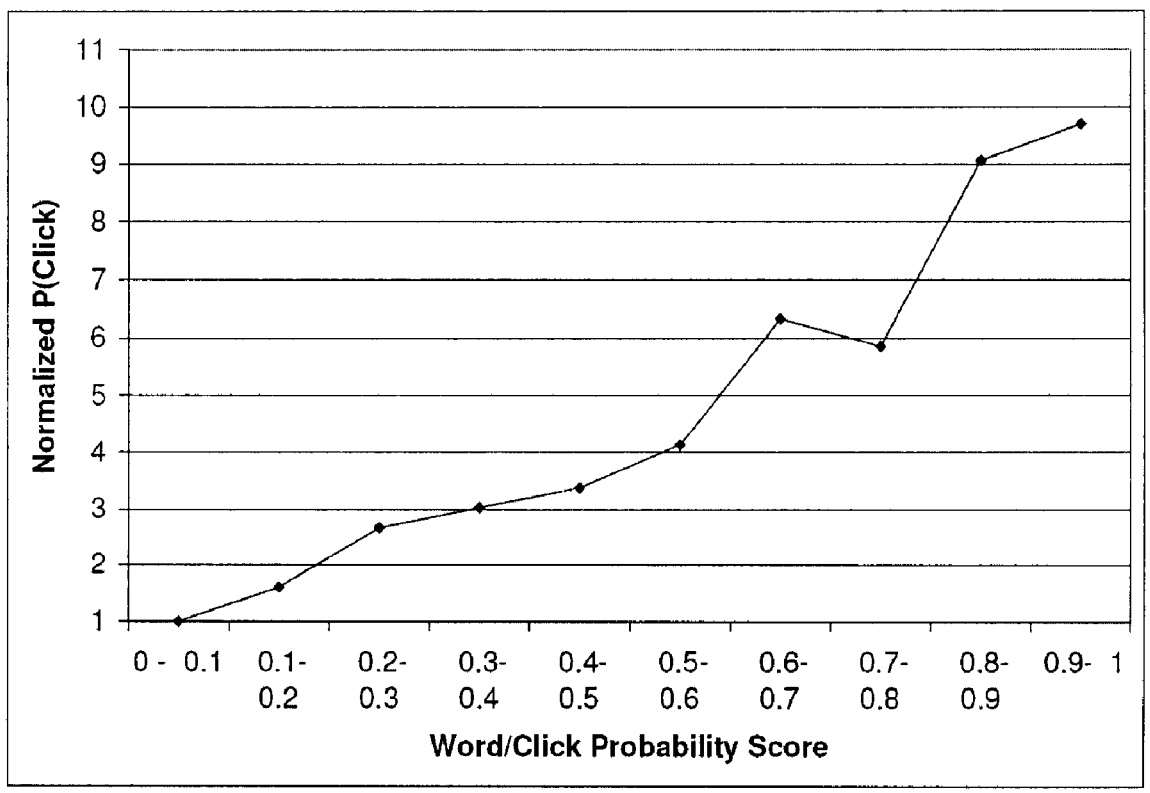

FIG. 5 provides a graphic example of news click probabilities and query click probabilities for use in accordance with one or more embodiments of the present disclosure.

Figures 6A, 6B:
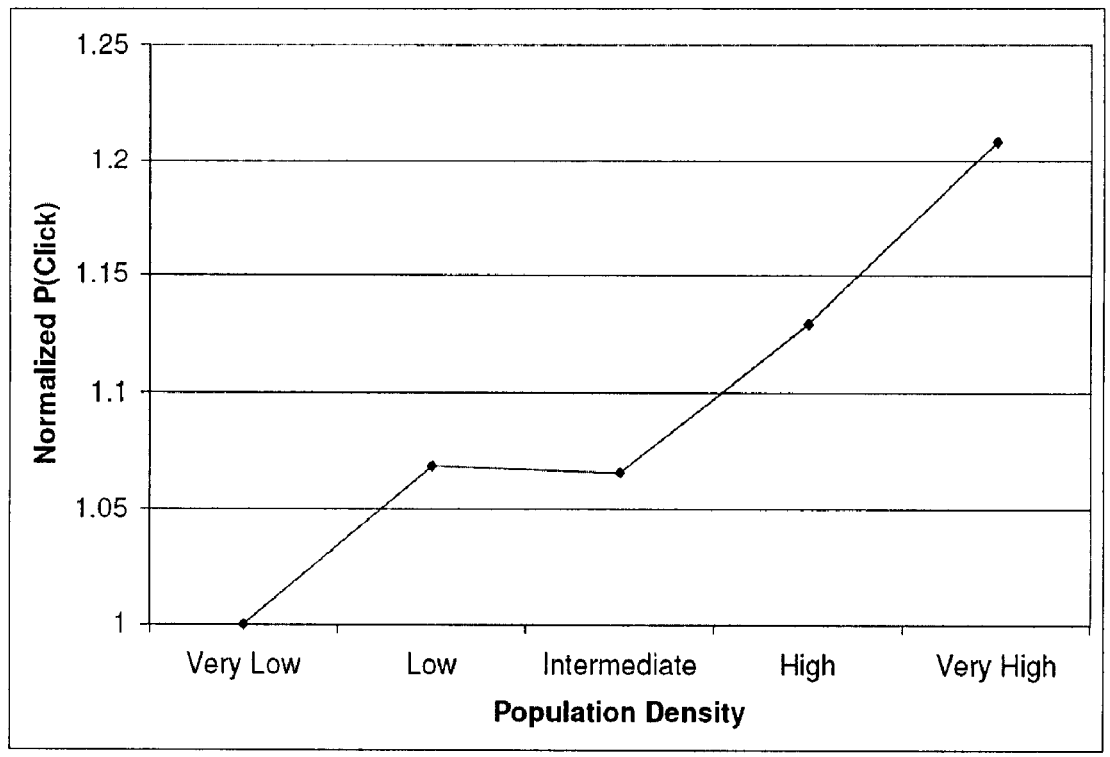

FIG. 6A provides a graphic example of a news click probabilities and population densities for use in accordance with one or more embodiments of the present disclosure.

FIG. 6B provides an example of the population density range for each population bin, with a population density value representing the number of persons per square kilometer.

Figures 7A, 7B:
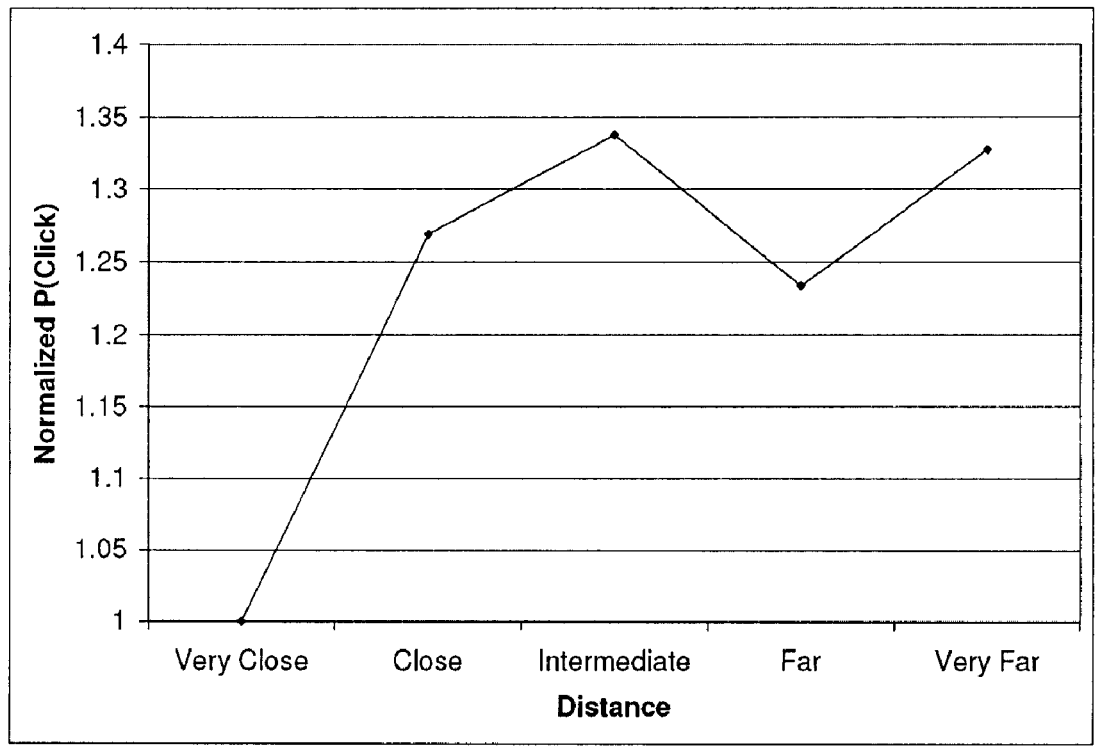

FIG. 7A provides a graphic example of news click probabilities and distances for use in accordance with one or more embodiments of the present disclosure.

FIG. 7B provides an example of the distance ranges of each bin shown in FIG. 7A.

FIG. 8A provides an example of features that can be used in accordance with one or more embodiments of the present disclosure.

FIG. 8B provides an example of feature values determined for some query strings/terms found in training data.

FIG. 9 provides examples of features other than geo-spatial features that can be used in accordance with one or more embodiments of the present disclosure.

Figure 10:
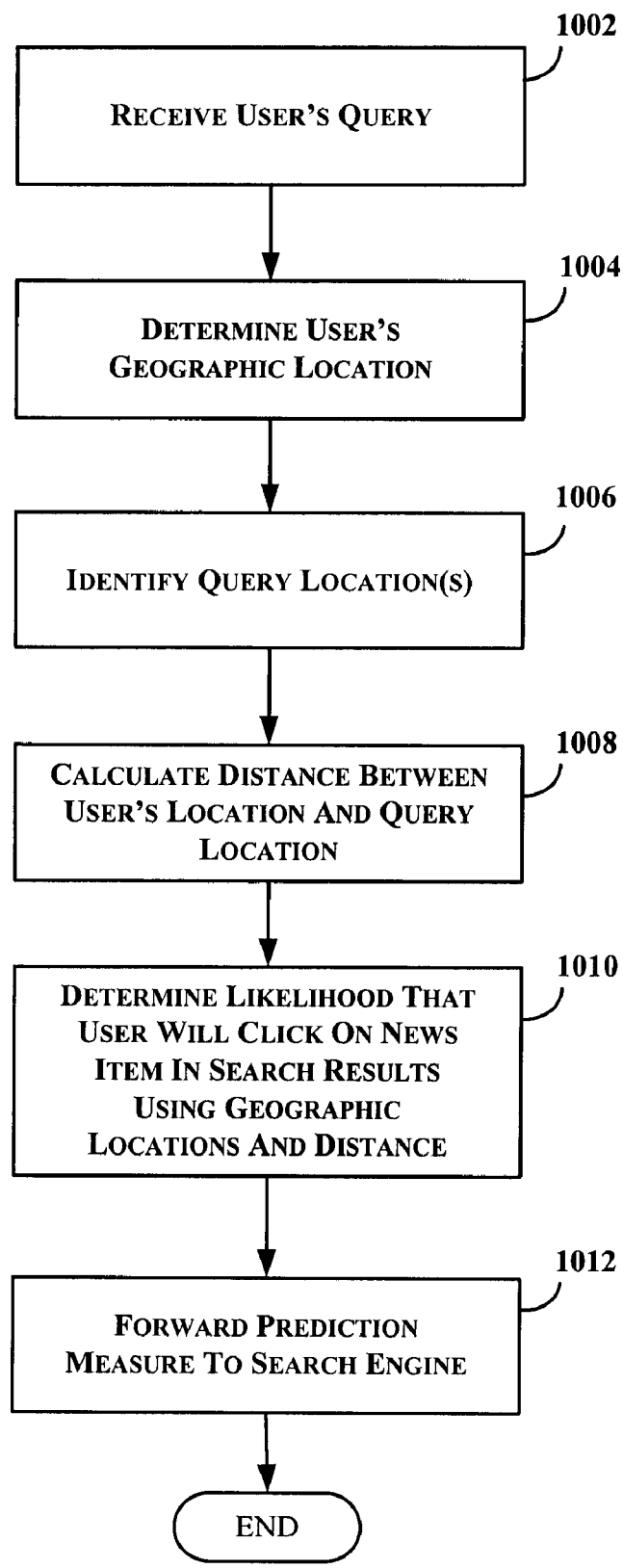

FIG. 10 provides an example of a prediction measurement process flow using user location, query location and distance information in accordance with one or more embodiments of the present disclosure.

FIG. 11 illustrates some components that can be used in connection with one or more embodiments of the present disclosure.

DETAILED DESCRIPTION

In general, the present disclosure includes a search result display system and method and architecture.

Certain embodiments of the present disclosure will now be discussed with reference to the aforementioned figures, wherein like reference numerals refer to like components.

In accordance with one or more embodiments, one or more factors associated with a query are used to determine a likelihood that a user will click on an information type if the type of information is included in a set of search results returned in response to the query. In accordance with one or more such embodiments, one such information type is news, e.g., items having news content. In accordance with one or more such embodiments, prediction information can comprise geo-spatial information, geographic-related factors, or features, such as, without limitation, a user's geographic location, location identified by the query, and a distance between the user's geographic location and geographic location(s) identified by the query.

In accordance with one or more embodiments, a prediction measure can be based on a relationship between geographic information contained in a query and a user's geographic location information. By way of a non-limiting example, the distance between the user's geographic location and a geographic location identified in a query can act as a predictor of clicks on news, as a type of information in a set of search results. By way of a further non-limiting example, as is discussed in more detail below, a likelihood of an occurrence of a news click, e.g., a selection of a news item, in a set of search results by the user, has been empirically shown to be at least more likely than not if a query contains one or more geographic locations, and that the likelihood is even greater in a case that the query contains a location that is distant from the user's geographic location. By way of a yet another non-limiting example, empirical evidence further indicates that a query's topic can affect the likelihood of a news click, e.g., some topics are more likely to receive clicks from distant users, while others are of more local interest. Without limitation and by way of a non-limiting example, earthquakes and hurricanes may receive clicks from distant users, while crashes and lotteries may be of interest to more nearby users. Other factors or features that can be used to make a prediction, or generate a prediction measure, include without limitation a query location confidence score, location type, location newsworthiness, population density and topological containment of an identified geographic location within another geographic location.

FIG. 1 provides an example of a click prediction process flow in accordance with one or more embodiments of the present disclosure. The process flow can be implemented by any computing system, including a server that executes a search engine or is in communication with a computing system that executes a search engine. At step 102, a query is received from a user. At step 104, information is collected for use in making a prediction. At step 106, a prediction, also referred to herein as a prediction measurement or prediction measure, is generated using the information collected in step 104. The prediction is a measure of the likelihood that an item, or items, having an associated information type will be clicked on by the user if the item(s) are included in the search results returned to the user. At step 108, the prediction can be used to make a determination whether or not to include an item, or items, of the information type in the search results. By way of a non-limiting example, the prediction can be used by a search engine, together with the search criteria specified in the query, to identify the contents of the search results.

FIG. 2 provides a general overview of system components for use in accordance with one or more embodiments. A trainer 214, which comprises a feature extractor/generator 216 and a model generator 218, is used to generate a model definition. The model definition generated by model generator 216 is used by prediction engine, or prediction generator, 206 to make a prediction, which can be forwarded to search engine/system 202. As discussed above, the prediction provides a measure of the likelihood that a type of information will be selected, if one or more items of the type of information are included in the returned search results. Search engine/system 202 receives a query, e.g., a query submitted by a user, and provides query results, e.g., search results returned to the user that submitted the query. Search engine/system 202 can use the prediction forwarded by a prediction engine 206 to determine whether or not to include the type of information item, e.g., news, in the search results. By way of a non-limiting example, search engine/system 202 can determine whether or not to include the type of information in the search results based on whether or not the prediction satisfies a threshold, such as 50% threshold. By way of a further non-limiting example, the search engine/system 202 can include items of the type of information for which the prediction is generated in a case that such type of information items are located in the search and the prediction is at least 50%, i.e., there is at least a 50% likelihood that the user will click on the type of information if it is included in the search results returned to the user. It should be apparent that other thresholds, or threshold ranges, can be used in connection with one or more embodiments.

To receive a prediction from prediction engine 206, search engine/system 202 can forward a received query to predictor, or prediction system, 208. Predictor 208 comprises feature extractor/generator 204 and prediction engine 206. In accordance with one or more embodiments, feature extractor/generator 204 can be the same as feature extractor/generator 216. In accordance with one or more such embodiments, trainer 214 and predictor 208 can share a feature extractor/generator, or use different instances of the feature extractor/generator.

Feature extractor/generator 204 of predictor 208 collects information, e.g., prediction information, which is used by prediction engine 206 to make a prediction. Feature extractor/generator 216 collects information, which is used by model generator 218 to generate a model definition used by prediction engine 206. Feature extractor/generator 204 typically operates on a current query, and feature extractor/generator 216 typically operates on historical data, e.g., a set of previous queries and associated information. It should be apparent, however, that embodiments of the present disclosure are not limited with respect to the information on which a feature extractor/generator operates.

In accordance with one or more embodiments, trainer 214 generates model 206 using one or more query logs 210. Query log 210 can comprise information provided by search engine/system 202, which is collected over a period of time, e.g. a number of weeks. By way of a non-limiting example, a query log 210 can comprise a number of queries, e.g. two million queries collected over a period of time, and information associated with each query in the query log 210. By way of a further non-limiting example, information associated with each query can comprise the query string, e.g., one or more search criteria or terms, and the search results forwarded to the user, or other submitter. The search results can identify a number of items, e.g., web page, file, multimedia content, etc., each of which has a link, such as a universal resource locator (URL), to the actual item. For example, a news item could be returned as part of the search results in the form of a link and a brief description of the content of the news item. In correspondence with the search results, the query log 210 can identify which ones of the items in the search results were selected, e.g., clicked on, by the user, if any. In accordance with one or more embodiments, trainer 214 can use one or more other data stores or databases. By way of a non-limiting example, trainer 214 can use existing population and/or population density information, which can be obtained from a data store or database 212.

In accordance with one or more embodiments, the query logs 210 used by trainer 214 can include at least a subset of queries, in which a small box containing up to three news articles where presented as part of the search results returned, e.g., located above the top-ranked result, if the query retrieved any documents in a news index. News intent can be assumed if users, in response to this display, clicked on a news article. The data set used by trainer 214 can include IP address, query and click or selection information. A user location can be inferred from the IP address, the search query can be a case-normalized query, and the click can be an indicator, e.g., a binary indicator, indicating whether or not the user clicked on a news item included in the search results.

The prediction information output by the feature extractor/generator, e.g. generator 204 and/or 216, can comprise any of a number of features. In accordance with one or more embodiments, as discussed above in connection with step 104 of FIG. 1 and predictor 208 and trainer 214 of FIG. 2, information used to make a prediction and/or build a model definition used by prediction engine 206 is collected, e.g., from a current query or a previous query, such as that stored in a query log 210. In accordance with one or more embodiments, information can be extracted from the query, which information can be used to generate other information, any and all of which can be used to make a prediction. In accordance with one or more embodiments, the information includes geographic information, such as without limitation geographic information extracted from the query, geographic information determined for the user, and a distance between locations.

In accordance with one or more embodiments, a system such as that described in commonly-assigned U.S. Patent Publication Number 2005/0108213, U.S. application Ser. No. 10/745,093, entitled Geographical Location Extraction, filed on Dec. 22, 2003, the contents of which are incorporated herein by reference, can be used to identify geographic location, e.g., place names, in a query. Briefly, words in a search query that denote place names can be identified using context-dependent and context-independent features in the query. A place name identified in the query can be mapped to a large database of place names to identify a particular location as the place name, or location, intended by the user.

More particularly and in accordance with one or more embodiments of the present disclosure, the above system can be used to assign a score to search word or phrase, or candidate place name, in a query. The score can be used as an estimate of a level of confidence that the candidate place name is being used as a place name in the context of the query. In accordance with one or more embodiments, a candidate place name can be considered to be a place name in a case that the assigned score, or value, satisfies a threshold, e.g., the assigned score is greater than 0.5, or falls within a threshold range, e.g., the assigned score is between 0.5 and 1. In a case that a query contains more than one candidate place name, a maximum score of all locations in the query can be used. By way of a non-limiting example, the probability that a query is referring to a location can be determined to be the maximum geographic probability of each word or phrase in the query. The maximum geographic probability can be an aggregate value. Alternatively, the maximum geographic probability can be the maximum of the geographic probabilities determined for the words or phrases in the query.

The system can assign a score, e.g., the geographic probability, to the candidate place name, e.g., the search word or phrase in a query, using a keyword database and geographic place names database. By way of a non-limiting example, the keyword database can be empirically derived through analysis of a number of documents, e.g., web pages and/or other documents, to identify words and/or phrases and the number of occurrences of the words and/or phrases in the documents. The geographic place names database can comprises a database of known place names. The score assigned to a search word or phrase comprises two probabilities, and is determined based on whether or not the search word or phrase it is found in the keyword database, the place names database or both. In a case that the search word is found in the keyword database and not in the place names database, the search word is assigned a non-geographic probability of 1.0 and a geographic probability of 0.0. A word that is found in the place names database and not the keyword database is assigned a non-geographic probability of 0.0 and a geographic probability of 1.0. In a case that a search word is found in both the keyword and the place names databases, a probability split can be based on the search word's frequency, e.g., number of occurrences in the documents analyzed to create the keyword database use frequency, and a significance of the search word or phrase as a place name.

In accordance with one or more embodiments a user's geographic location is determined using an Internet Protocol (IP) address of the user issuing the query. By way of a non-limiting example, information supplied by the Regional Internet Registry (RIR), a governing body responsible for the administration of Internet addresses in a specific geographic region, is used to determine the user's geographic location using the user's IP address. An RIR database tracks IP addresses, Internet Service Providers (ISPs), and general geographic location. Using information contained in the RIR database, geographic location information, e.g., city and state information, can be determined using the user's IP address. It should be apparent that a user's geographic location can be determined using other techniques, including without limitation, a GPS-enabled device, mobile device cell tower location, user-supplied location information, user profile information, etc.

In accordance with one or more embodiments, to measure a distance between two geographic locations, each location is mapped to a longitude and latitude, and a standard spherical distance between the longitudes and latitudes is calculated. In a case that a geographic location, such as a place name, refers to a general area, such as a state or country, a bounding box can be used to represent the area, and a longitude and latitude can be determined for the center of the bounding box. The longitude and latitude of the center of the bounding box can be used to determine a distance.

Embodiments of the present disclosure can take into account topological containment. For example and in a case that a first geographic location is contained within a second geographic location, the distance between the two locations can be defined to be zero. By way of a further non-limiting example, in a case of two locations defined by bounding boxes and a first location's bounding box is contained within the second locations' bounding box, a distance between the two locations can be determined to be the distance between the centers of the two bounding boxes corresponding to the two locations. By way of another non-limiting example, the distance between a location and itself can be defined to be zero.

Based on empirical analysis conducted in accordance with one or more embodiments, a correlation exists between query location confidence and the probability of a news click. Queries with high location confidence are found to be more likely to receive news clicks than queries with low location probabilities. By way of a non-limiting example, queries containing a place name with a query location confidence score greater than the 0.5 threshold score can be up to twice as likely to receive a news click as queries which are determined to not contain a place name.

FIG. 3 provides a graphic example of news click probabilities and levels of confidence in the location in a query for use in accordance with one or more embodiments of the present disclosure. The horizontal axis represents different levels of confidence that a term, or terms, in a query are a place name. The vertical axis represents a probability of receiving a news click for each confidence interval. As illustrated in the graphic example, queries with high location confidence are more likely to receive news clicks, and queries with low location confidence are less likely to receive news clicks.

In accordance with one or more embodiments, a location type is identified for each place name identified in a query. A location type can be defined using a pre-determined classification scheme, such as continent, country, state, city, town, postal zone, such as zip code, etc. A location type can be used as a categorical feature and a number, e.g., a weighting or probability, can be associated with each possible category.

FIG. 4 provides a graphic example of news click probabilities and type of a location identified in a query for use in accordance with one or more embodiments of the present disclosure. The horizontal axis represents different location types. The vertical axis represents a news click probability, e.g., likelihood that a news item is selected, for each location type. As can be seen from the graphic example, countries and states are more likely to be associated with queries that received news clicks, which suggests that users tend to use country and state names more often when they are looking for news. On the other hand, towns are more likely to be associated with queries that did not receive news clicks, which indicates that users specify town names more often when they are looking for non-news results like services and businesses.

Accordingly, location type, e.g., county, state, city, town, etc., can be used as a factor in making a prediction.

In accordance with one or more embodiments, a place name can be assigned a click probability, which is a measure of the location's "newsworthiness." Newsworthiness click probability of a location can be the result of the amount of newsworthy events that have occurred at the location, for example. By way of a non-limiting example, a query that includes "kosovo" or "pakistan" is more likely to lead to a news click than a query with a place name like "cedar point", or "utah". Place names "cedar point" and "utah" are likely included in a query for which informational items, rather than news items, are being searched. In accordance with one or more embodiments, the newsworthiness measure, or click probability, can comprise a measure, or probability, determined from an analysis of a training set that includes query logs, e.g., query logs 210. A probability table can be created, which specifies, for each place name, the probability that a query containing the place name will result in a news click. The table can include place names determined to occur a certain number of times, e.g., 20 times, in the training set. A place name's click probability, P(p), can be determined as follows:

$$P(p) = \frac{N_{click}(p)}{N_{click}(p) + N_{noclick}(p)}, \quad (1)$$

In equation (1) above, $N_{click}(p)$ is a number of queries containing place name p that received news clicks, and $N_{noclick}(p)$ is a number of queries containing place name p that did not receive news clicks.

Each query can be assigned a newsworthiness click probability, L(q), based on the click probabilities of the place names that it contains. The following provides an example of an equation that can be used to determine a query's newsworthiness click probability:

$$L(q) = d \frac{N_{clicks}}{N_{clicks} + N_{noclicks}} + (1-d)\max_p P(p), \quad (2)$$

In equation (2) above, $N_{click}$ represents a total number of queries in the training set that received news clicks, $N_{noclick}$ represents a total number of queries in the training set that did not receive news clicks, $\max_p P(p)$ represents a maximum place name click probability selected from the click probabilities determined for the query, and d is a damping factor, which can be chosen, for example, in the interval [0.1, 0.2]. In accordance with one or more embodiments, the damping factor, d, can be included to smooth the values assigned to queries. By way of a non-limiting example, if the probability of the place name with the maximum probability is used instead of equation (2), queries with unseen place names, e.g., place names not having a click probability, would be assigned a query click probability of zero. The damping factor, d, ensures that a query will get a nonzero probability even if the place names in the query have never been seen before.

By way of some non-limiting examples, and in connection with one training set, places such as Kosovo, Manila, Serbia, Pakistan, Afghanistan, Lebanon, and Iran were assigned higher newsworthiness click probabilities than Bali, Guam, Nashville, Lincoln, Hampton, Napa and Alaska. Some place names, e.g., place names with high newsworthiness click probability, can have a relatively stable click probability over time, while other place names may not, e.g., the place name is related to a specific event, such that their newsworthiness click probability is likely to change with time. In accordance with one or more embodiments, a place name's newsworthiness click probability can be updated periodically to reflect such variations.

FIG. 5 provides a graphic example of news click probabilities and query click probabilities for use in accordance with one or more embodiments of the present disclosure. The horizontal axis represents ranges, or bins, of newsworthiness click probabilities, L(q), associated with a set of queries. The vertical axis represents normalized P(Click) values, e.g., a range of possible probabilities of receiving a news click. Each point in the graph corresponds to a bin of L(q) values and a corresponding P(Click) value. The P(Click) and L(q) values were determined using a training data set. The graph shows that there can be a strong correlation between the L(q) score and the probability that it will receive a news click, such that queries with high L(q) scores are most likely to receive a news result click, and queries with low scores are unlikely to receive news clicks. The graph further illustrates that, in the example shown in FIG. 3, the likelihood of receiving a news click increases as query L(q) scores increase. As can be seen from the example shown by the graph if FIG. 3, a query's L(q) score can be used in predicting news result clicks. Furthermore, it shows that presence of a location in a query can be used in predicting whether a news item in search results for the query will be selected, e.g., be clicked on.

In accordance with one or more embodiments, another factor that can be used to generate a prediction relates to population density, e.g., user-related population density. In accordance with one or more embodiments, United States Census Bureau population data can be used, together with the user's location, to determine a population density for the user that generated the query. The user-related population density can be associated with the user's query, and used as a factor in generating a prediction.

FIG. 6A provides a graphic example of a news click probabilities and population densities for use in accordance with one or more embodiments of the present disclosure. The horizontal axis represents population densities assigned to queries in the training data, e.g., query log(s) 210. The vertical axis represents normalized P(Click) values, e.g., a range of possible probabilities of receiving a news click. In the example of FIG. 4A, each query is assigned to a population bin, e.g., Very Low, Low, Intermediate, High, and Very High population bins. FIG. 6B provides an example of the population density range for each population bin, with a population density value representing the number of persons per square kilometer. By way of a non-limiting example, training data includes such towns as Pahrump, Nev., Buckeye, Ariz., both of which had a determined population density of approximately 30 persons/km$^2$, as well as cities such as New York, N.Y. San Francisco, Calif., both of which had an approximate population density of 10,000+ persons/km$^2$. In the example graph shown in FIG. 6A, the towns of Pahrump, Nev. and Buckeye, Ariz. fall in the Very Low population density bin, while the cities of New York, N.Y. and San Francisco, Calif. fall in the Very High population density bin. From the example graph of FIG. 6A, population density has an effect on the probability of receiving a news click. The example graph of FIG. 6A shows that users from areas with high population density are more interested in news and are 20% more likely to click on news results. While the effect may not be as significant as an L(q) score, based on the training data, population density can be used, in accordance with one or more embodiments, in making a prediction.

As discussed above, in accordance with one or more embodiments, the distance between a user's geographic location and a location indicated in a query can be used in making the prediction. FIG. 7A provides a graphic example of news click probabilities and distances for use in accordance with one or more embodiments of the present disclosure. A query in the training set is assigned to a bin based on a distance measure determined between an identified location of the user and a location specified in the query. FIG. 7B provides an example of the distance ranges of each bin shown in FIG. 7A. The distances are in kilometers. The vertical axis represents the probability of receiving a news click for each distance bin. The empirical testing conducted using the training data indicates that queries are less likely to receive news clicks when the distance is small. As the distance increases, queries become more likely to receive news clicks. The empirical testing further indicates that the difference between the click probabilities for short and long distances is relatively small. While the effect may not be as significant as an L(q) score, based on the training data, user/query distance can be used, in accordance with one or more embodiments, in making a prediction.

In accordance with one or more embodiments, training data is used to build a learning model, which is used to make a prediction. In accordance with one or more such embodiments, a relationship between clicks and sets of geographic features, such as those described herein, are used with the learning model. A geographic feature can be used alone or in combination with other geographic features.

In accordance with one or more embodiments, one or more geographic features are input to a prediction engine, e.g., prediction engine 206, and a prediction is output. In addition to providing a mechanism for identifying relationships between geographic features and clicks, the model can be used to output a prediction that can be used with a decision-making component of a search engine. For example, if the model, e.g., the prediction output by the model, suggests that a particular query is likely to receive a news click, the search engine may include more news items in the search results.

Gradient tree boosting (Treenet) and support vector machines (SVM) can be used, in accordance with one or more embodiments, for building a model definition for use by the prediction engine. In accordance with one or more embodiments, a portion of the training data, e.g., 60% of the data, can be used as a training data set to generate the model definition, e.g., to train the prediction engine, and a remaining portion, e.g., 40% of the data, can be used as a testing data set to test the model definition and prediction engine. The training and testing data sets can comprise actual queries sampled from query logs representing multiple time periods. The data can be balanced such that 50% of the data represents queries that received news clicks and the other 50% represent queries that did not receive news clicks. Different supervised learning classifiers can be trained using on the training data resulting in multiple models, and the resulting models can be used to predict news clicks for queries in the test data. A model can assign a value in a range of values to each query in the testing data set. By way of a non-limiting example, the range can comprise [−1, 1], to each query. The closer the value is to 1, the more likely the query will receive a news click. Conversely, the closer the value to −1, the less likely the query will receive a news click.

FIG. 8A provides an example of features that can be used in accordance with one or more embodiments of the present disclosure. Each row corresponds to one feature, e.g., corresponds to a location confidence, or loc_conf. Exemplary values and/or value ranges are provided for each feature. In addition, an importance score is associated with each feature, which can be used as an indicator of the feature's importance relative to the other features in making a prediction. In the example shown and FIG. 8A, the location word/click probability score, or newsworthiness score, L(q), has the highest importance score, location type is second in importance with location confidence being third, etc.

FIG. 8B provides an example of feature values determined for some query strings/terms found in training data. The feature values, which include two different distance calculations, can be used as a model definition for use by prediction engine 206.

In accordance with one or more embodiments of the present disclosure, features other than geo-spatial features, e.g., the geo-spatial features described above, can be used by a prediction engine 206. FIG. 9 provides examples of features other than geo-spatial features that can be used in accordance with one or more embodiments of the present disclosure.

FIG. 10 provides an example of a prediction measurement process flow using user location, query location and distance information in accordance with one or more embodiments of the present disclosure. At step 1002, a user's query is received, e.g., from search engine/system 202 by predictor 208. At step 1004, the user's geographic location is determined. For example, search engine/system 202 can forward the user's IP address to predictor 208, e.g., with the query. By way of a non-limiting example, feature extractor/generator 204 determines the user's geographic location based on an IP address. At step 1006, feature extractor/generator 204 uses the query to identify query locations identified in the query. At step 1008, feature extractor/generator 204 can calculate a distance between the user's location and a query location specified in the query. At step 1010, feature extractor/generator 204 forwards the prediction information, e.g., the user's geographic location, the query location(s) and calculated distances(s), to prediction engine 206. Prediction engine 206 uses the prediction information forwarded by feature extractor/generator 204 to make a prediction, i.e., determine the likelihood that the user will click on a news item in search results, using the geographic location and distance information forwarded by feature extractor/generator 204. At step 1012, predictor 208 forwards the prediction to search engine/system 202.

FIG. 11 illustrates some components that can be used in connection with one or more embodiments of the present disclosure. In accordance with one or more embodiments of the present disclosure, one or more computing devices, e.g., one or more servers 1102, user devices 1104 or other computing device can be configured to comprise functionality described herein. For example, a server 1202 can be configured as trainer 212, predictor 208 and/or search engine/system 202 in accordance with one or more embodiments of the present disclosure. The same or another computing device 1202 can be configured as trainer 212, predictor 208 and/or search engine 202. In accordance with one or more embodiments, in addition to using a prediction measure provided by predictor 208 to identify a set of search results, search engine/system 202 can be configured as a web crawler, and as a searcher and ranker of search results. In addition to using the prediction measure for determining whether or not to include a type of information in the search results, a prediction measure can be used to determine a ranking for the items in the search results. Data store 1108 can comprise the query log(s) 210, for example.

Computing device 1102 can serve content, e.g., search results, to user computers 1104 using a browser application via a network 1106. A user can submit a query via a user computer 1104 and network 1106.

The user computer 1104 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 1102 and the user computer 1104 can include one or more processors, memory, a removable media reader, network interface, display and interface, and one or more input devices, e.g., keyboard, keypad, mouse, etc. and input device interface, for example. One skilled in the art will recognize that server 1102 and user computer 1104 may be configured in many different ways and implemented using many different combinations of hardware, software, or firmware.

In accordance with one or more embodiments, a computing device 1102 can make a user interface available to a user computer 1104 via the network 1106. The user interface made available to the user computer 1104 can include content items, or identifiers (e.g., URLs) selected for the user interface based on a prediction measure generated in accordance with one or more embodiments of the present invention. In accordance with one or more embodiments, computing device 1102 makes a user interface available to a user computer 1104 by communicating a definition of the user interface to the user computer 1104 via the network 1106. The user interface definition can be specified using any of a number of languages, including without limitation a markup language such as Hypertext Markup Language, scripts, applets and the like. The user interface definition can be processed by an application executing on the user computer 1104, such as a browser application, to output the user interface on a display coupled, e.g., a display directly or indirectly connected, to the user computer 1104.

In an embodiment the network 1106 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 11. Alternatively, embodiments of the present disclosure can be implemented other environments, e.g., a peer-to-peer environment as one non-limiting example.

One or more embodiments of the present disclosure can be used in combination with other prediction techniques, e.g., non-geo-based prediction techniques. By way of a non-limiting example, the prediction measure determined in accordance with one or more embodiments of the present disclosure can be used with a newsworthiness prediction described in commonly-owned U.S. patent application Ser. No. 12/104,111, filed Apr. 16, 2008, entitled "Predicting Newsworthy Queries Using Combined Online and Offline Models", which is incorporated herein by reference in its entirety.

Briefly and in accordance with at least one embodiment disclosed in the referenced application, a machine learning approach and offline and online models are used to predict a query's newsworthiness. The offline model, which can be generated using any number of sources, e.g., web search logs, news search logs, news index, etc., includes a "white list" of newsworthy queries and a "black list," which represents or includes queries that are not to be considered newsworthy. The online model can be generated using a news index, for example.

In accordance with at least one disclosed embodiment, if an incoming query matches a query on the white list and is not filtered out by the black list, the incoming query is considered to be newsworthy, indicative of inclusion of news-related results in the search results. An incoming query can be scored based on attributes or characteristics of the query, which score can be used to identify a ranking of news-related results in the search page, for example. Query attributes or characteristics listed include number of words, number of matching articles, relevance score, query category (e.g., celebrity, local, shopping, etc.), commercial nature of the query, search volume and/or click through rate (CTR) in different contexts (e.g., news search vs. web search), comparison of volume or CRTs in different contexts, CTR relative to different sections of the same page, publication, date (i.e., recency), title and/or abstract match, source reputation, velocity (i.e., trends in features over time), etc. If the incoming query is not matched to any queries on the white list, it is passed to an online model, where it can be matched to any news articles determined to relate to recent news events, e.g., a completely new news event not represented in the offline model, a new development for an existing news event represented in the offline model, identified using the online model. Any news articles determined to relate to the incoming query using the online model can be included in a search results page.

In accordance with one or more embodiments of the present disclosure, an incoming query's newsworthiness determined using one or more embodiments of the referenced application can be used in combination with the geo-based prediction measure generated in accordance with one or more embodiments disclosed herein to determine whether or not to include news-related items, or results, in a set of search results, and/or a ranking of news-related items in the search results. In accordance with one or more embodiments, the geo-based prediction model can be incorporated into the offline model, the online model, or both. By way of a non-limiting example, one or more embodiments can be used to generate the white list, e.g., identifying newsworthy queries, and or the black list, e.g., representing queries that are not be considered newsworthy.

For the purposes of this disclosure a computer readable medium stores computer data, which data can include computer program code executable by a computer, in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method implemented by at least one processing device, comprising:
   collecting, by the processing device, prediction information using a received query, the prediction information comprises geo-spatial information including a location name identified in the received query and a newsworthiness click probability value for the location name, the newsworthiness click probability value is obtained from a probability table that specifies, for each place name, a probability that a query comprising the place name will result in a click on a news item;
   calculating, by the processing device, a prediction measure using the collected prediction information prior to executing the received query for generating a search result set, the prediction measure being a measure of the likelihood that a user will select a news item type of information returned in response to the query;
   transmitting, by the processing device, the prediction measure for generating content of the search result set.

2. The method of claim 1, further comprising:
   using, by a processor, the prediction measure to determine whether or not to include one or more items of the news item type of information in the set of search results generated using the query.

3. The method of claim 1, wherein the geo-spatial information comprises a location of a user that submitted the query, and a distance between the user's location and the location identified in the query.

4. The method of claim 3, wherein the information collected further comprises a location type, the method further comprising:

identifying, by the processing device, a location type for the location identified in the query using a location classification scheme.

5. The method of claim 3, wherein the information collected further comprises a confidence score, the confidence score identifying a level of confidence that a term used in the query is a place name.

6. The method of claim 3, wherein the information collected further comprises a population measure of at least one of the user's location and the location identified in the query.

7. The method of claim 3, wherein the information collected further comprises a population density measure of at least one of the user's location and the location identified in the query.

8. The method of claim 1, wherein the information collected further comprises non-geo-spatial information.

9. The method of claim 1, wherein the information collected further comprises a query location confidence score.

10. The method of claim 1, wherein calculating a prediction measure is performed using a model definition generated using training data comprising query logs, the query logs identifying a number of queries, for each query the query logs identifying the search results generated for the query and the search terms used to generate the search results, and for each query for which the search results included at least one item of the type of information the query log identifies whether or not the at least one item was selected.

11. A system comprising:
one or more processors and at least a processor readable storage device having stored thereon:
a feature extractor configured to collect prediction information using a received query, the information comprises geo-spatial information including at least a location name identified in the received query and a newsworthiness click probability value determined for the location name, the newsworthiness click probability value is obtained from a probability table that specifies for each place name, a probability that a query comprising the place name will result in a click on a news item; and
a prediction engine configured to calculate and transmit a prediction measure using the collected information prior to executing the received query for generating a set of search results, the prediction measure being a measure of the likelihood that a user will select a news item type of information returned in response to the query.

12. The system of claim 11, further comprising:
a search engine configured to use the prediction measure to determine whether or not to include one or more items of the news item type of information in a set of search results generated using the query.

13. The system of claim 11, wherein the geo-spatial information comprises a location of a user that submitted the query, and a distance between the user's location and the location identified in the query.

14. The system of claim 13, wherein the information collected further comprises a location type, the method further comprising: identifying a location type for the location identified in the query using a location classification scheme.

15. The system of claim 13, wherein the information collected further comprises a confidence score, the confidence score identifying a level of confidence that a term used in the query is a place name.

16. The system of claim 13, wherein the information collected further comprises a population measure of at least one of the user's location and the location identified in the query.

17. The system of claim 13, wherein the information collected further comprises a population density measure of at least one of the user's location and the location identified in the query.

18. The system of claim 11, wherein the information collected further comprises non-geo-spatial information.

19. The system of claim 11, wherein the information collected further comprises a query location confidence score.

20. The system of claim 11, further comprising a trainer configured to generate a model definition that is used by the prediction engine to calculate the prediction measure, the trainer is configured to generate the model definition using training data comprising query logs, the query logs identifying a number of queries, for each query the query logs identifying the search results generated for the query and the search terms used to generate the search results, and for each query for which the search results included at least one item of the type of information the query log identifies whether or not the at least one item was selected.

21. A non-transitory computer-readable medium tangibly storing program code thereon, the program code comprising:
code to collect prediction information using a received query, the prediction information comprises geo-spatial information including a location name identified in the received query, a newsworthiness click probability value determined for the location name, the newsworthiness click probability value is obtained from a probability table that specifies for each place name, a probability that a query comprising the place name will result in a click on a news item;
code to calculate a prediction measure using the collected information prior to execution of the received query for generation of search results, the prediction measure being a measure of the likelihood that a user will select a news item type of information returned in response to the query; and
code to transmit the prediction measure for the generation of the search results.

22. The medium of claim 21, the program code further comprising: code to use the prediction measure to determine whether or not to include one or more items of the news item type of information in a set of search results generated using the query.

23. The medium of claim 21, wherein the geo-spatial information comprises a location of a user that submitted the query, and a distance between the user's location and the location identified in the query.

24. The medium of claim 23, wherein the information collected further comprises a location type, the method further comprising: identifying a location type for the location identified in the query using a location classification scheme.

25. The medium of claim 23, wherein the information collected further comprises a confidence score, the confidence score identifying a level of confidence that a term used in the query is a place name.

26. The medium of claim 23, wherein the information collected further comprises a population measure of at least one of the user's location and the location identified in the query.

27. The medium of claim 23, wherein the information collected further comprises a population density measure of at least one of the user's location and the location identified in the query.

28. The medium of claim 21, wherein the information collected further comprises non-geo-spatial information.

29. The medium of claim 21, wherein the information collected further comprises a query location confidence score.

30. The medium of claim 21, wherein code to calculate a prediction measure is performed using a model definition generated using training data comprising query logs, the query logs identifying a number of queries, for each query the query logs identifying the search results generated for the query and the search terms used to generate the search results, and for each query for which the search results included at least one item of the type of information the query log identifies whether or not the at least one item was selected.

* * * * *